United States Patent [19]

Nagato

[11] Patent Number: 4,972,205

[45] Date of Patent: Nov. 20, 1990

[54] THERMAL PRINTING HEAD

[75] Inventor: Yoshiaki Nagato, Nagaokakyo, Japan

[73] Assignee: Rohm Co., Ltd., Kyoto, Japan

[21] Appl. No.: 443,319

[22] Filed: Nov. 30, 1989

[30] Foreign Application Priority Data

Dec. 8, 1988 [JP] Japan ................................ 63-159923
Dec. 13, 1988 [JP] Japan ................................ 63-161496

[51] Int. Cl.$^5$ ................................................ G01D 15/10
[52] U.S. Cl. ............................ 346/76 PH; 346/139 C
[58] Field of Search ....................... 346/76 PH, 139 C; 249/216 PH

[56] References Cited

U.S. PATENT DOCUMENTS 3,855,448 12/1974 Hanagata .......................... 346/76 R

FOREIGN PATENT DOCUMENTS 0255872 11/1986 Japan ............................ 219/216 PH
63-151466 6/1988 Japan .
63-221055 9/1988 Japan .

*Primary Examiner*—Bruce A. Reynolds
*Assistant Examiner*—Huan Tran
*Attorney, Agent, or Firm*—William H. Eilberg

[57] ABSTRACT

A thermal printing head according to the present invention comprises a heat sink plate carrying, on its one surface, heating elements and a presser cover. The presser cover receives heat from the heat sink plate with a time lag through screws used to mount the presser cover. The heat sink plate is further provided, on its opposite surface, with a compensating plate which serves to prevent or restrain the thermal head from bending due to the delay in heat transmission between the heat sink plate and the presser cover.

15 Claims, 4 Drawing Sheets

THERMAL PRINTING HEAD

BACKGROUND OF THE INVENTION

1. Field of the Invention:

This invention relates to a thermal printing head which is used for example to print on a thermosensitive paper or to cause ink transfer from a thermal transfer ribbon or film onto a printing paper. More particularly, the present invention relates to improvements in such a thermal printing head.

2. Description of the Prior Art:

As is well known, thermal printing heads are widely used in facsimile machines to print transmitted information on a thermosensitive paper. The thermal printing head is also used in printers of the type wherein the ink of a transfer ink ribbon or film is thermally caused to be transferred onto a printing paper.

There are various types of thermal printing heads which include a line-type head and a matrix-type head. The line-type thermal printing head has a row (line) of multiple heating elements, as disclosed for example in Japanese Patent Application Laid-open No. 63-151466 or No. 63-221055. The matrix-type thermal printing head has a multiplicity of heating elements arranged in a matrix, as disclosed for example in U.S. Pat. No. 3,855,448 to Hanagata et al.

A typical line-type thermal printing head is now described with reference to FIG. 6 of the accompanying drawings for the convenience of explanation.

As shown in FIG. 6, the prior art thermal printing head comprises a strip-like head circuit board 101 adhesively mounted on a rectangular heat sink plate 102 along one longitudinal side thereof. The head circuit board 101 has a longitudinal row (line) of multiple heating elements 103 positioned adjacent to the one longitudinal side of the heat sink plate, and a driver circuit 104 for selectively energizing the heating elements. The head circuit board further has a comb-like input terminal portion 115 positioned away from the one longitudinal side of the heat sink plate.

On the heat sink plate 102 is further mounted a strip-like connector circuit board 106 to partially project beyond the other longitudinal side of the heat sink. The connector circuit board comprises a flexible film 107 and a reinforcing backing 108 attached to the underside of the film. Further, the flexible film is provided on its underside with a comb-like output terminal portion 109 in overlapping relation to the input terminal portion 115 of the head circuit board 101.

A rectangular presser cover 110 is arranged above the connector circuit board 106. The presser cover is fixed to the heat sink plate 102 by means of screws 111 engaging into a row of threaded bores 112 formed in the heat sink plate 102. A presser rubber 113 is interposed between the flexible film 107 of the connector circuit board and the presser cover to press the respective terminal portions 115, 109 into intimate overlapping contact.

Generally, the heat sink plate 102 and the presser cover 110 are equally made of aluminum because this material is light in weight and yet easily formed into any desired shape. Therefore, these two parts have the same coefficient of linear expansion when they receive heat from the heating elements 103. However, the heat sink plate 102 receives such heat immediately from the heating elements, whereas the presser cover 110 receives the heat indirectly through the mounting screws 111 with a time lag. Thus, at the time of initiating the actuation of the heating elements or abruptly changing the actuating voltage for the heating elements, the heat transmitting time lag leads to a difference in the degree of longitudinal expansion between the heat sink plate and the presser cover at least before reaching a steady state, thereby causing longitudinal bending of the thermal printing head as a whole. Such bending obviously results in deterioration of printing quality.

The two Laid-open Japanese patent applications referred to above also disclose a similar thermal printing head wherein a presser cover receives heat from a heat sink plate indirectly through mounting screws. Therefore, the thermal printing head of these two Japanese application has a similar problem.

SUMMARY OF THE INVENTION

It is, therefore, an object of the present invention to provide a thermal printing head, particularly a line-type printing head, which is improved to prevent or restrain bending at all times, thereby always ensuring a high printing quality.

Another object of the present invention is provide a thermal printing head which, while retaining the above advantages, requires only minor modifications from the prior art arrangement.

According to the present invention, there is provided a thermal printing head comprising: a heat sink having an opposite pair of mounting surfaces, one mounting surface being held in heat conduction with heating elements; a cover member mounted to the one mounting surface of the heat sink and held in heat conduction therewith through heat transmitting means which is capable of transmitting heat with a time lag, the combination of the cover member and the heat sink generating a bending force in one direction upon energization of the heating elements; and a compensating member mounted to the opposite mounting surface of the heat sink in heat conduction therewith, the combination of the compensating member and the heat sink generating a bending force in another direction opposite to the one direction upon energization of the heating elements.

With the arrangement described above, the presser member and the compensating member are disposed on the opposite sides of the heat sink to produce bending forces in opposite directions. Thus, the thermal printing head as a whole is prevented or restrained from bending, thereby ensuring a good printing quality at all times.

According to a preferred embodiment of the present invention, the compensating member has substantially the same coefficient of linear expansion as the cover member, and the compensating member is spaced from the opposite mounting surface of the heat sink by intervening spacer means which is made of a heat insulating material, the compensating member being held in heat conduction with the heat sink through another heat transmitting means which is capable of transmitting heat with substantially the same time lag as the heat transmitting means for the cover member. In such an arrangement, the heat sink, the presser member and the compensating member may be equally made of aluminum for example to contribute to an overall weight reduction.

According to another preferred embodiment of the invention, the compensating member is directly mounted to the opposite mounting surface of the heat sink to be in direct heat conduction therewith, the compensating member being smaller in coefficient of linear expansion than the heat sink. With this arrangement, it is possible to make the spacer means unnecessary, which means a less departure from the prior art arrangement.

Other objects, features and advantages of the invention will be fully understood from the following detailed description given with reference to the accompanying drawings.

DETAILED DESCRIPTION OF THE PREFERRED EMBODIMENTS

Figure 1:
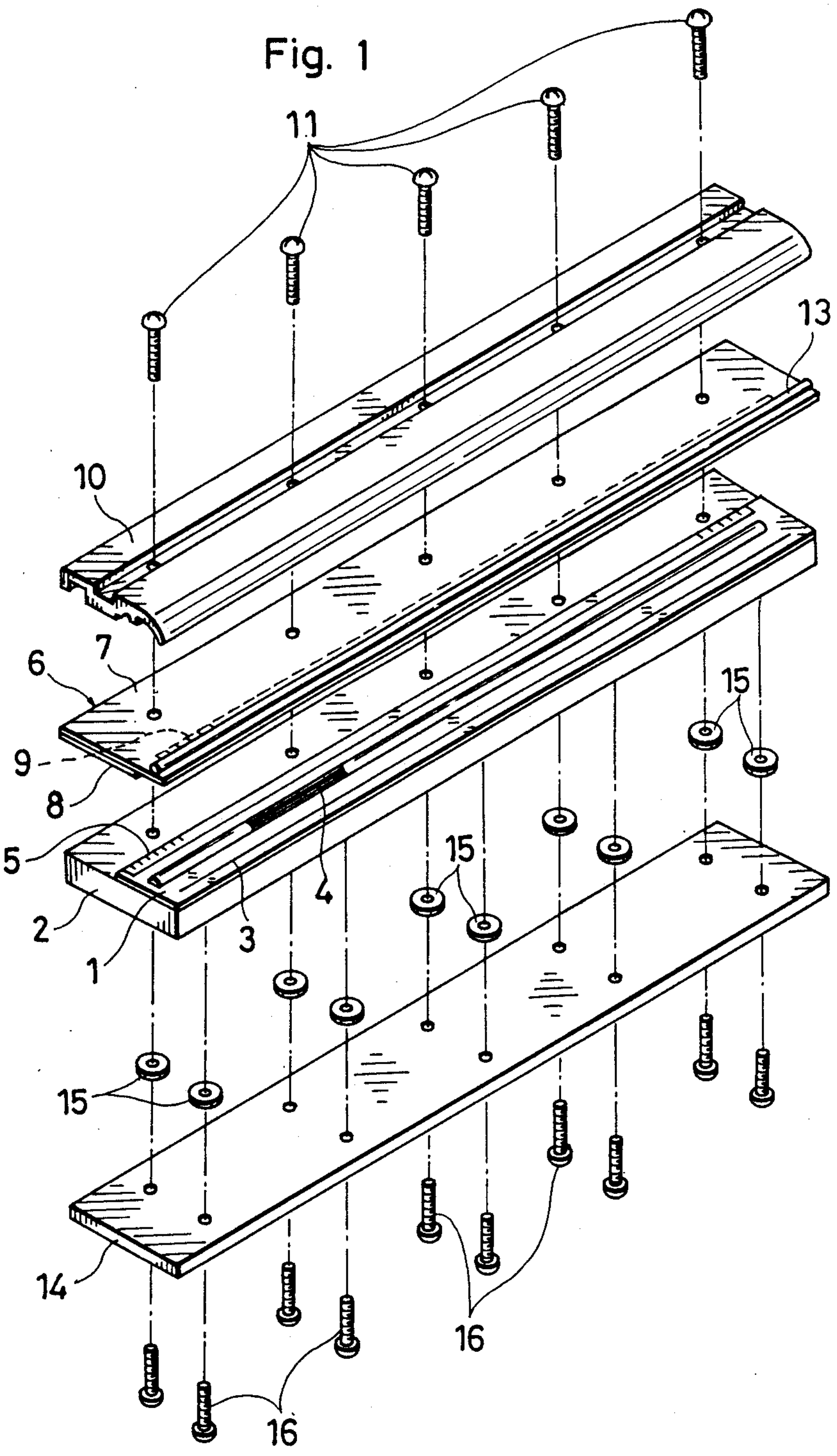
FIG. 1 is an exploded perspective view showing a thermal printing head embodying the present invention.
Figure 2:
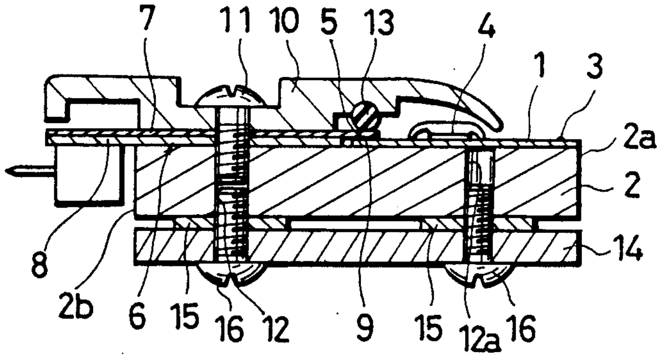
FIG. 2 is an enlarged view, in transverse section, showing the same thermal printing head in an assembled condition.

Referring to FIGS. 1 and 2 of the accompanying drawings, there is illustrated a line-type thermal printing head which comprises a strip-like head circuit board 1 adhesively mounted on a rectangular heat sink plate 2 along one longitudinal side 2*a* thereof. The heat sink plate may be made of a heat conductive metal such as aluminum.

The head circuit board 1 has a longitudinal row of multiple heating elements 3 positioned adjacent to the one longitudinal side 2*a* of the heat sink plate, and a driver circuit 4 for selectively energizing the heating elements to conduct intended printing on a thermosensitive paper (not shown). The head circuit board further has a comb-like input terminal portion 5 positioned away from the one longitudinal side 2*a* of the heat sink plate.

On the heat sink plate 2 is further mounted a strip-like connector circuit board 6 to partially project beyond the other longitudinal side 2*b* of the heat sink. The connector circuit board comprises a flexible film 7 and a reinforcing backing 8 attached to the underside of the film. The flexible film 7, which may be made of polyimide for example, is formed on both faces thereof with circuit patterns as well as with protective coating layers. Further, the flexible film is provided on its underside with a comb-like output terminal portion 9 in overlapping relation to the input terminal portion 5 of the head circuit board 1. Thus, the printing data and driving power from an external circuit (not shown) can be supplied into the driver circuit 4 through the connector circuit board 6. The reinforcing backing 8 may be made of a glass epoxy resin (glass-fiber-reinforced epoxy resin) for example.

A rectangular presser cover 10 made of aluminum for example is arranged above the connector circuit board 6. The presser cover is fixed to the heat sink plate 2 by means of screws 11 engaging into a row of threaded bores 12 formed in the heat sink. A presser rubber 13 is interposed between the flexible film 7 of the connector circuit board and the presser cover to press the respective terminal portions 5, 9 into intimate overlapping contact.

Figure 6:
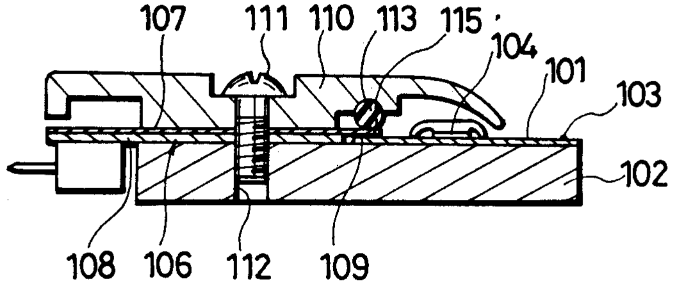
Fig. 6 Prior Art
FIG. 6 is a view, in transverse section, showing a prior art line-type thermal printing head.

The arrangement described above is substantially identical to that of the prior art shown in FIG. 6. The present invention features the following arrangement for preventing or restraining bending of the printing head.

As shown in FIGS. 1 and 2, a rectangular compensating plate 14 is mounted to the underside of the heat sink plate 2. Two rows of ring spacers 15 are interposed between the heat sink plate and the compensating plate. To enable mounting the compensating plate, the heat sink plate is formed with another row of threaded bores 12*a*. Screws 16 are engaged into the two rows of threaded bores 12, 12*a* to fix the compensating plate and the ring spacers relative to the heat sink.

According to the embodiment shown in FIGS. 1 and 2, the compensating plate 14 has a size (area) substantially equal to the heat sink 2, and is made of aluminum which is also a material used to make the presser cover 10. The ring spacers 15 are made of a material, such as glass epoxy resin, which is very low in heat conduction.

With the thermal printing head described above, the heat generated by the heating elements 3 is first received by the heat sink plate 2, and thereafter transmitted not only to the presser cover 10 but also to the compensating plate 14. Obviously, the heat transmission to the presser cover is conducted through the screws 11, while the heat transmission to the compensating plate is conducted through the screws 16 Therefore, the heat transmission to the presser plate and to the compensating plate involves a similar time lag. Since the presser cover and the compensating plate are located on the opposite sides of the heat sink plate, such a similarity in time lag results in that opposite bending forces are generated at the printing head t substantially offset each other. Thus, the printing head as a whole is prevented or restrained from longitudinally bending in either direction, thereby preventing a printing quality deterioration which would be caused by bending of the thermal printing head.

As easily appreciated from FIG. 2, one row of threaded bores 12 are commonly used for mounting the presser cover 10 and the compensating plate 14. Thus, only one additional row of threaded bores 12*a* is required to mount the compensating plate. It is of course possible to omit this additional row of threaded bores 12*a* together with the corresponding ring spacers 15 and screws 16. It is further possible that the compensating plate 14 is formed with a row of threaded bores (not shown), and the screws 11 used for fixing the presser cover 10 are extended enough to engage into the row of threaded bores of the compensating plate. In this case, the bores 12 may be threaded or non-threaded.

Further, the spacers 15 may be made of a heat conductive material and adhesively attached both to the heat sink plate 2 and the compensating plate 14. In this way, the compensating plate is fixed to the heat sink plate without using the screws 16, and the heat from the heat sink plate is transmitted through the heat conductive spacers with a suitable time delay.

Figure 3A:
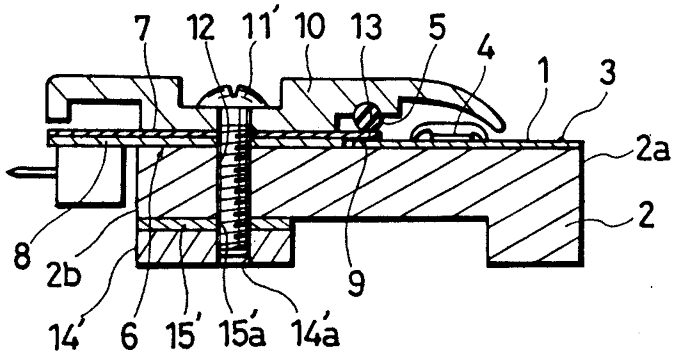
FIG. 3*a* is a sectional view similar to FIG. 2 but showing a modified thermal printing head according to the present invention.
Figure 3B:
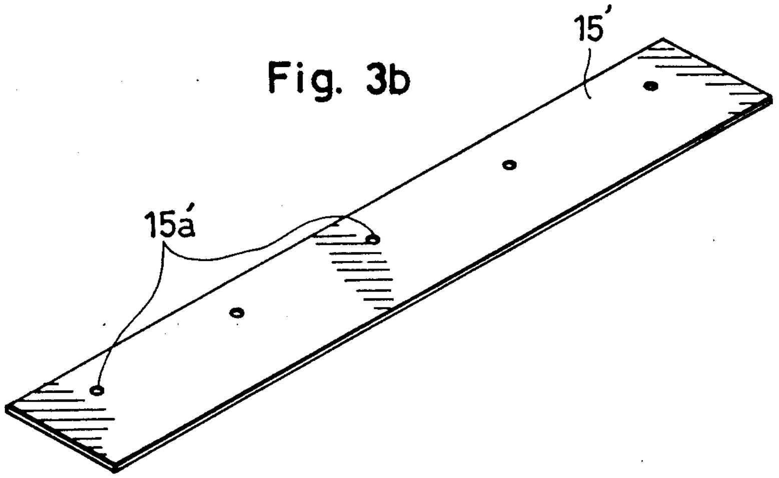
FIG. 3*b* is a perspective view showing a spacer plate to be incorporated into the printing head of FIG. 3*a*.

FIGS. 3*a* and 3*b* show a modified thermal printing head according to the present invention. The modified head comprises a heat sink plate 2 which is formed only with a single row of threaded bores 12 for mounting a presser cover 10 by means of screws 11'. The screws 11' are long enough to project beyond the underside of the heat sink plate.

The modified printing head further includes a compensating plate 14' which is formed with a single row of threaded bores **14*a*" in corresponding relation to the threaded bores 12 of the heat sink plate 2. A heat insulating spacer plate 15' formed with a corresponding row of non-threaded bores 15*a*'** (see FIG. 3*b*) is interposed between the heat sink plate 2 and the compensating plate 14'. The spacer plate and the compensating plate are smaller in width than but equal in length to the heat sink plate. These two plates are mounted to the heat sink plate by engaging the cover mounting screws 11' into the threaded bores **14*a*'** of the compensating plate. The thermal printing head shown in FIGS. 3*a* and 3*b* is otherwise the same as that of the foregoing embodiment. It should be appreciated that the bores 12 of the heat sink plate 2 may be non-threaded because a complete assembly can be achieved simply by engagement between the screws 12 and the threaded bores **14*a*'** *of the compensating plate 14'*.

Obviously, the use of the single spacer plate 15' makes the assembling operation much easier than using the separate spacer rings 15 shown in FIGS. 1 and 2. Moreover, the cover mounting screws 11' can be also used to mount the compensating plate 14', and the needs not be provided with an additional row of threaded bores. Thus, the modified thermal printing head can be manufactured at a much lower cost than the printing head of the foregoing embodiment.

Figure 4:
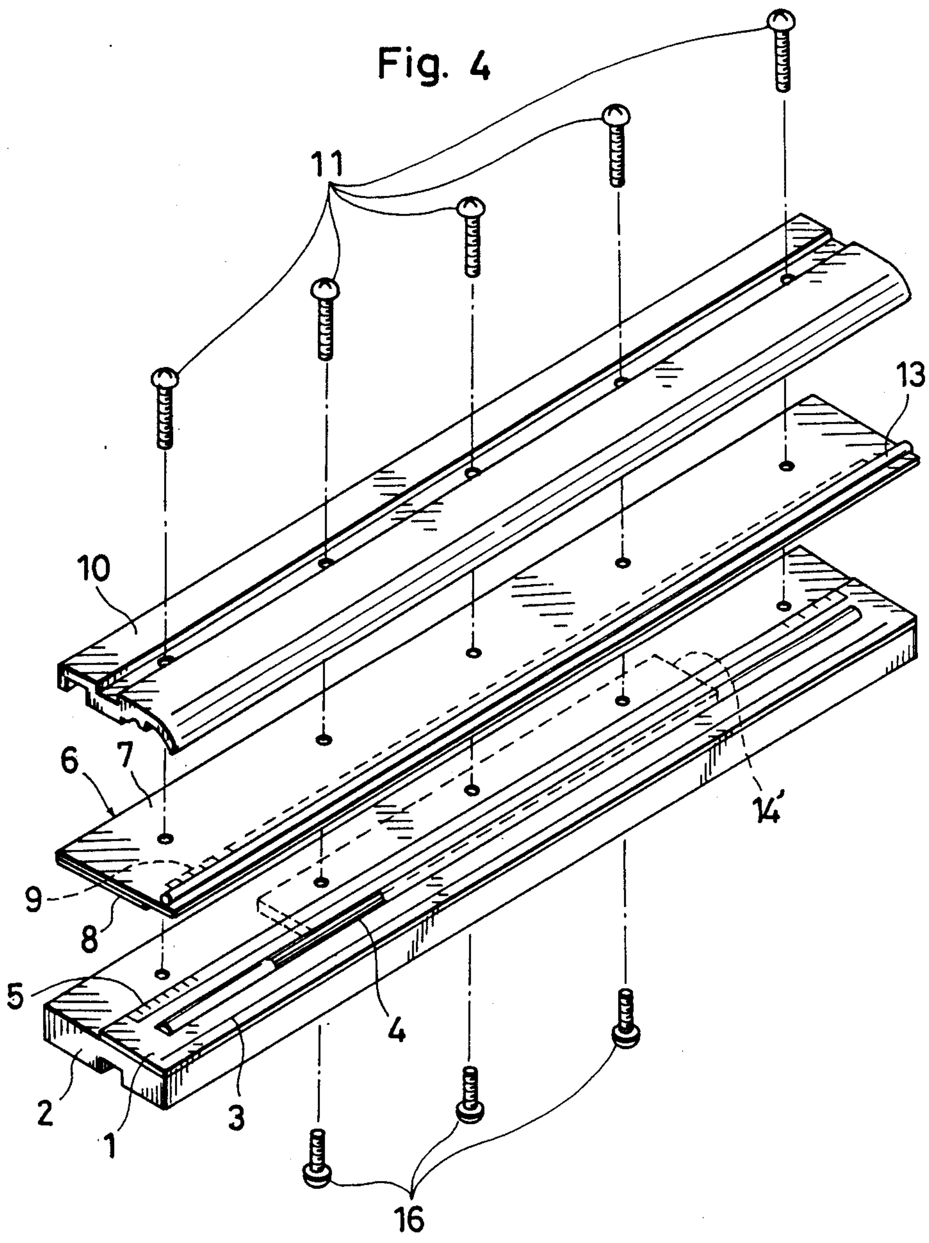
FIG. 4 is an exploded perspective view showing another thermal printing head embodying the present invention.
Figure 5:
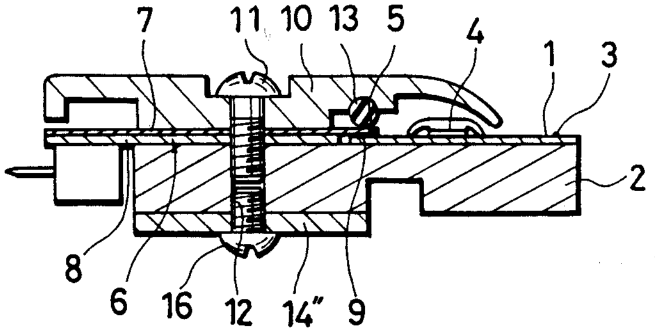
FIG. 5 is an enlarged view, in transverse section, showing the thermal printing head of FIG. 4 in an assembled condition.

FIGS. 4 and 5 show another thermal printing head which differs from the thermal printing head of the foregoing embodiment in that a compensating plate 14' is mounted to the underside of the heat sink plate 2 in direct heat conduction therewith. A row of screws 16 are engaged into the corresponding row of threaded bores 12 of the heat sink plate, thereby fixing the compensating plate relative to the heat sink plate. However, the compensating plate may be adhesively attached to the underside of the heat sink plate.

In this modified embodiment, the compensating plate 14" is made of a material which has a smaller coefficient of linear expansion than the heat sink plate 2. For example, if the heat sink plate is made of aluminum, the compensating plate may be made of a ferrous metal such as steel. The compensating plate, which is illustrated in FIGS. 4 and 5 as smaller in size than the heat sink plate, may be equal in size to the heat sink plate.

According to the embodiment shown in FIGS. 4 and 5, a bending force is generated due to a time lag of heat transmission between the heat sink plate 2 and the presser cover 10. However, a counteracting or opposite bending force is also produced due to a difference in coefficient of linear expansion between the heat sink plate and the compensating plate 14". Thus, the thermal printing head as a whole is prevented or restrained from bending, thereby maintaining a high printing quality at all times.

The present invention being thus described, it is obvious that the same may be varied in many other ways. For instance, the present invention is applicable to any types of thermal printing heads as long as the head has a presser cover or like member arranged on one side of a heat sink to receive the heat from the heat sink with a time lag. Further, the compensating plate or the spacer(s) may have any optional shape. Such variations are not to be regarded as a departure from the spirit and scope of the invention, and all such modifications as would be obvious to those skilled in art are intended to be included within the scope of the following claims.

I claim:

1. A thermal printing head comprising:

a heat sink having an opposite pair of mounting surfaces, one mounting surface being held in heat conduction with a head circuit board which carries heating elements;

a cover member mounted to said one mounting surface of said heat sink and held in heat conduction therewith through heat transmitting means which is capable of transmitting heat with a time lag, the combination of said cover member and said heat sink generating a bending force in one direction upon energization of said heating elements; and a compensating member mounted to the opposite mounting surface of said heat sink and held in heat conduction therewith, the combination of said compensating member and said heat sink generating a bending force in another direction opposite to said one direction upon energization of said heating elements.

2. The thermal printing head as defined in claim 1, wherein said compensating member has substantially the same coefficient of linear expansion as said cover member, said compensating member being spaced from said opposite mounting surface of said heat sink by intervening spacer means which is made of a heat insulating material, said compensating member being capable of receiving heat from said heat sink with substantially the same time lag as said cover member receives heat from said heat sink.

3. The thermal printing head as defined in claim 2, wherein said heat transmitting means for said cover member comprises screws which are engaged into said heat sink for mounting said cover member to said heat sink.

4. The thermal printing head as defined in claim 2, wherein said compensating member is mounted to said heat sink by screws which are engaged into said heat sink, said screws being capable of transmitting heat from said heat sink to said compensating member with substantially the same time lag as said heat transmitting means.

5. The thermal printing head as defined in claim 2, wherein said heat transmitting means for said cover member comprises screws which penetrates through said cover member and said heat sink into engagement with said compensating member for mounting said cover member and said compensating member to said heat sink, said screws also serving to transmit heat from said heat sink to said compensating member.

6. The thermal printing head as defined in claim 2, wherein said spacer means comprises separate spacers.

7. The thermal printing head as defined in claim 2, wherein said spacer means comprises a spacer plate which is formed with bores.

8. The thermal printing head as defined in claim 7, wherein said bores of said spacer plate are threaded.

9. The thermal printing head as defined in claim 1, wherein said compensating member is directly mounted to said opposite mounting surface of said heat sink to be in direct heat conduction therewith, said compensating member being smaller in coefficient of linear expansion than said heat sink.

10. The thermal printing head as defined in claim 9, wherein said heat transmitting means comprises screws which are engaged into said heat sink for mounting said cover member to said heat sink.

11. A thermal printing head comprising:

a heat sink plate having an opposite pair of mounting surfaces, one mounting surface carrying a head circuit board which is provided with a row of heating elements and an input terminal portion, said one mounting surface further carrying a connector circuit board which is provided with an output terminal portion overlapped on said input terminal portion of said head circuit board;

a presser cover mounted on said connector circuit board by screws engaged into said heat sink plate for pressing said two terminal portions into intimate overlapping relation, said screws further serving to transmit heat from said heat sink plate to said presser cover with a time lag;

a compensating member mounted to the opposite mounting surface of said heat sink plate as spaced therefrom, said compensating member having substantially the same coefficient of linear expansion as said presser cover; and heat transmitting means for transmitting heat from said heat sink plate to said compensating member with substantially the same time lag as said screws.

12. The thermal printing head as defined in claim 1, wherein said compensating member is spaced from said heat sink plate by spacer means which is made of a heat insulating material, said heat transmitting means comprising screws engaged into said heat sink plate for mounting said compensating plate to said heat sink plate.

13. A thermal printing head comprising:

a heat sink plate having an opposite pair of mounting surfaces, one mounting surface carrying a head circuit board which is provided with a row of heating elements and an input terminal portion, said one mounting surface further carrying a connector circuit board which is provided with an output terminal portion overlapped on said input terminal portion of said head circuit board;

a presser cover mounted on said connector circuit board by screws for pressing said two terminal portions into intimate overlapping relation; and a compensating member mounted to the opposite mounting surface of said heat sink plate as spaced therefrom, said compensating member having substantially the same coefficient of linear expansion as said presser cover;

wherein said screws penetrate through said presser cover and said heat sink plate into engagement with said compensating member, said screws serving to transmit heat from said heat sink both to said presser cover and said compensating member with substantially the same time lag.

14. The thermal printing head as defined in claim 13, wherein said compensating member is spaced from said heat sink plate by a spacer plate which is made of a heat insulating material.

15. A thermal printing head comprising:

a heat sink plate having an opposite pair of mounting surfaces, one mounting surface carrying a head circuit board which is provided with a row of heating elements and an input terminal portion, said one mounting surface further carrying a connector circuit board which is provided with an output terminal portion overlapped on said input terminal portion of said head circuit board;

a presser cover mounted on said connector circuit board by screws engaged into said heat sink plate for pressing said two terminal portions into intimate overlapping relation, said screws further serving to transmit heat from said heat sink plate to said presser cover with a time lag; and a compensating member mounted to the opposite mounting surface of said heat sink plate in direct heat conduction therewith, said compensating member having a smaller coefficient of linear expansion than said heat sink plate.

* * * * *